(12) United States Patent
Mehdi et al.

(10) Patent No.: US 10,861,303 B2
(45) Date of Patent: Dec. 8, 2020

(54) MOUNT FOR A DEVICE

(71) Applicant: GOOGLE LLC, Mountain View, CA (US)

(72) Inventors: Rafat E. Mehdi, Palo Alto, CA (US); Jason Goulden, Los Gatos, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/882,129

(22) Filed: Jan. 29, 2018

(65) Prior Publication Data
US 2019/0236919 A1 Aug. 1, 2019

(51) Int. Cl.
G08B 13/196 (2006.01)
F16M 13/02 (2006.01)
G03B 17/56 (2006.01)
F16M 11/14 (2006.01)
H04N 5/225 (2006.01)
F16M 11/04 (2006.01)
H02G 3/12 (2006.01)

(52) U.S. Cl.
CPC ..... G08B 13/19619 (2013.01); F16M 11/041 (2013.01); F16M 11/14 (2013.01); F16M 13/02 (2013.01); G03B 17/561 (2013.01); G08B 13/19632 (2013.01); H02G 3/12 (2013.01); H04N 5/2251 (2013.01); H04N 5/2257 (2013.01); F16M 2200/08 (2013.01)

(58) Field of Classification Search
CPC ........ G08B 13/19619; G08B 13/19632; H02G 3/12
See application file for complete search history.

(56) References Cited

U.S. PATENT DOCUMENTS

| | | | |
|---|---|---|---|
| 4,687,170 A | 8/1987 | Beaver | |
| 6,268,882 B1 * | 7/2001 | Elberbaum | 396/427 |
| 8,404,971 B1 | 3/2013 | Gretz | |
| 9,423,672 B1 | 8/2016 | Kilgore et al. | |
| 2009/0308993 A1 | 12/2009 | Chang | |

(Continued)

OTHER PUBLICATIONS

"How do I wall mount my FLIR FX camera?" FLIR Systems, Inc. [online]. Retrieved from the Internet<https://www.flirsecure.com/support/self-serve/how-do-i-wall-mount-my-flir-fx-camera-/R-sc11600053>.

(Continued)

Primary Examiner — Twyler L Haskins
Assistant Examiner — Fayez Bhuiyan
(74) Attorney, Agent, or Firm — Morgan, Lewis & Bockius LLP

(57) ABSTRACT

A mount for a device includes a housing defining an interior space and including a distal exterior surface having an aperture connected to the interior space, a fastener configured to fasten to the device and disposed about a fastener axis, the fastener including a proximal portion positioned within the interior space of the housing and a distal portion extending through the aperture, the fastener being configured to move relative to the housing along the fastener axis in a distal-proximal direction and being prevented from substantially rotating about the fastener axis, and a biasing element attached to the proximal portion of the fastener, the biasing element configured to apply a force on the fastener in a proximal direction as the fastener moves in a distal direction relative to the housing.

31 Claims, 13 Drawing Sheets

(56) References Cited

U.S. PATENT DOCUMENTS

2012/0273630 A1* 11/2012 Gillespie-Brown .......................... F16M 11/041
248/122.1
2019/0013229 A1 1/2019 Cho et al.

OTHER PUBLICATIONS

"BIS Wall Plate 672 (Male Thread)" K Bis Fixing Accessories, Walraven, Sep. 2017.
European Search Report dated Jun. 24, 2019 for European Patent Application No. 19154146.5, 7 pages.

* cited by examiner

MOUNT FOR A DEVICE

TECHNICAL FIELD

The present invention relates to a mount for a device including, but not limited to, a mount for an electronic device such as camera module. The mount may be used for securing the device to a surface, for example, a wall, ceiling, or other substrate. The present invention further relates to systems including the mount and the device.

BACKGROUND

Usage of video cameras for surveillance or other tasks in residential and commercial environments has increased substantially, in part due to lower costs, the prevalence of sophisticated mobile devices having remote monitoring and control capabilities, and the increased availability of connectivity bandwidth. As consumer demands change and the complexity of home automation and related systems increases, various new challenges arise in designing such camera products.

Many home security cameras need to be affixed to a surface to ensure stability, but the installation of these cameras is often complex and cumbersome, especially if the cameras need to be positioned high on a ceiling or wall. Certain cameras include an internal screw thread which allows the camera to be screwed onto a threaded fastener with a corresponding external screw thread. In situations where the threaded fastener is rigidly fixed to a mount, the camera is typically rotated with respect to the mount until the fastener is fully screwed into the camera and the camera is fully seated against the mount. A problem with such mounts is that the final orientation of the camera at which the camera is fully seated against the mount is determined by the orientation of the thread of the fastener and cannot be easily adjusted by the user. Accordingly, the camera may not be properly oriented when the camera is fully seated against the mount.

SUMMARY

The present invention according to some implementations addresses the above needs and desires by providing a mount for cameras and other devices. In some implementations, a mount according to the present invention allows the camera or other electronic device to be easily attached to a surface (e.g., wall or ceiling) and oriented with respect to the mount. In some implementations, a mount according to the present invention provides the device with a rotational degree of freedom with respect to the mount to allow the device to be oriented at a desired position. In some implementations, a mount according to the present invention further allows the camera or other electronic device to be oriented by a user by hand without the use of or need for separate tools.

In some implementations, a mount for a device includes a housing defining an interior space and including a distal exterior surface having an aperture connected to the interior space, and a fastener configured to fasten to the device disposed about a fastener axis, the fastener including a proximal portion positioned within the interior space of the housing and a distal portion extending through the aperture. In some implementations, the distal portion of the fastener includes an external thread which is configured to mate with an internal thread of the device. In some implementations, the fastener is further configured to move relative to the housing along the fastener axis in a distal-proximal direction and is prevented from substantially rotating about the fastener axis. In some implementations, the mount further includes a biasing element attached to the proximal portion of the fastener, the biasing element configured to apply a force on the fastener in a proximal direction as the fastener moves in a distal direction relative to the housing.

In some implementations, the biasing element comprises a first portion attached to the proximal portion of the fastener, and a second portion fixed relative to the housing. In some implementations, the first portion is a central portion of the biasing element, and the second portion is a peripheral portion of the biasing element. In some implementations, the biasing element has a substantially planar configuration in an unloaded condition, and a curved configuration in a loaded condition when the fastener is moved relative to the housing. In further implementations, the biasing element includes a plurality of lobes coupled to and disposed circumferentially around the proximal portion of the fastener, each of the plurality of lobes having a peripheral end fixed relative to the housing. In some implementations, each of the plurality of lobes comprises at least one sinuous segment between the peripheral end of the lobe and the proximal portion of the fastener. The at least one sinuous segment may be elastic and configured to bend and/or stretch.

In some implementations, the fastener further includes a keyed feature which is configured to prevent rotation of the fastener relative to the housing about the fastener axis. The keyed feature may be disposed on the proximal portion of the fastener according to some implementations. In some implementations, the housing includes a recess shaped and positioned to receive the keyed feature. In some implementations, the housing further comprises a proximal exterior surface, the interior space being positioned between the proximal exterior surface and the distal exterior surface. In some implementations, the distal exterior surface has a broadest dimension greater than a broadest dimension of the proximal exterior surface. In some implementations, the proximal exterior surface does not include any apertures connecting to the interior space. In some implementations, the mount further includes an elastic pad positioned on the proximal exterior surface. In some implementations, the mount also includes at least one additional fastener configured to secure the mount onto a substrate (e.g., wall, ceiling, shelf, etc.).

The present invention, according to further implementations, also provides for a system including a mount and a device (e.g., camera) for coupling to the mount. A system according some such implementations includes a device including a base portion having a bottom surface and a fastener hole, and a mount for coupling to the device. The mount of the system may include a housing defining an interior space and including a distal exterior surface having an aperture connected to the interior space, a fastener disposed about a fastener axis, the fastener including a proximal portion positioned within the interior space of the housing and a distal portion extending through the aperture and sized to be at least partially received within the fastener hole, the fastener being configured to move relative to the housing along the fastener axis in a distal-proximal direction and being prevented from substantially rotating about the fastener axis. In some implementations of the system, the mount further includes a biasing element attached to the proximal portion of the fastener, the biasing element configured to apply a force on the fastener in a proximal direction as the fastener moves in a distal direction relative to the housing.

In some implementations of the system, the distal portion of the fastener includes a first thread, and the fastener hole of the device includes a second thread that is configured to mate with the first thread of the fastener. In some such implementations, rotation of the device in a first rotational direction relative to the mount about the fastener axis when the fastener is received in the fastener hole causes the bottom surface of the base portion of the device and the distal exterior surface of the housing of the mount to move towards each other. In some implementations, the device is in a fully coupled state relative to the mount when the fastener is received in the fastener hole and the bottom surface of the base portion of the device abuts against the distal exterior surface of the housing of the mount. In some implementations, the device is able to rotate in the first rotational direction relative to the mount about the fastener axis at least an additional 360 degrees (e.g., up to 540 degrees) after the device has reached the fully coupled state relative to the mount. In some implementations, additional rotation of the device in the first rotational direction relative to the mount after the device has reached the fully coupled state relative to the mount causes the movement of the fastener in the distal direction relative to the housing. In some implementations, the movement of the fastener in the distal direction relative to the housing causes the biasing element to transition from an unloaded condition to a loaded condition. In some such implementations, the biasing element is configured to increase a contact force between the bottom surface of the base portion of the device and the distal exterior surface of the housing of the mount as the biasing element transitions from the unloaded condition to the loaded condition.

BRIEF DESCRIPTION OF THE DRAWINGS

For a better understanding of the various described implementations, reference should be made to the Detailed Description of implementations below, in conjunction with the following drawings in which like reference numerals refer to corresponding parts throughout the figures.

DETAILED DESCRIPTION

Figure 1:
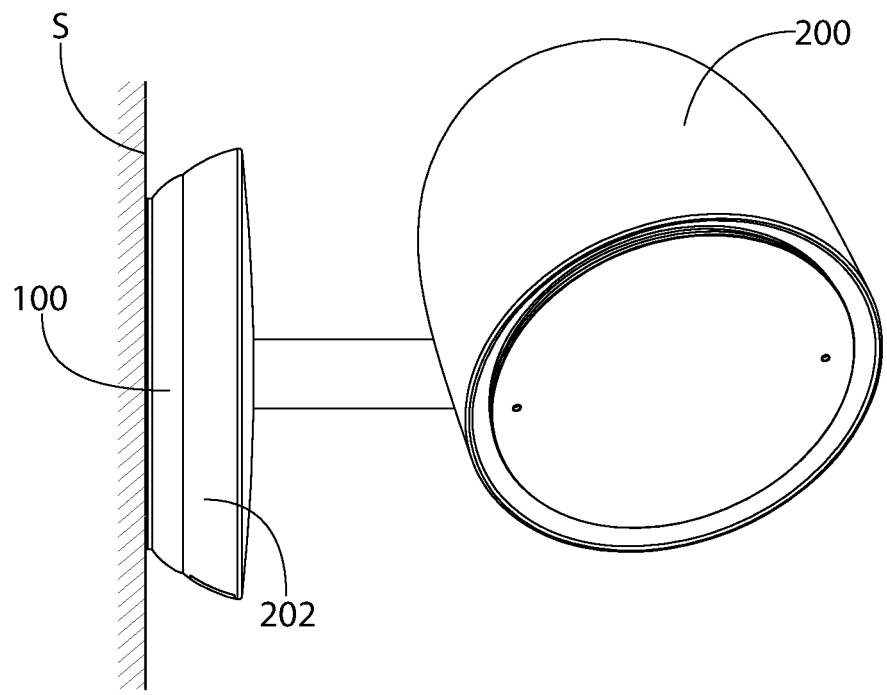
FIG. 1 shows a side view of a device, for example a camera, coupled to a mount that is mounted to a surface according to an implementation of the present invention.
Figure 2:
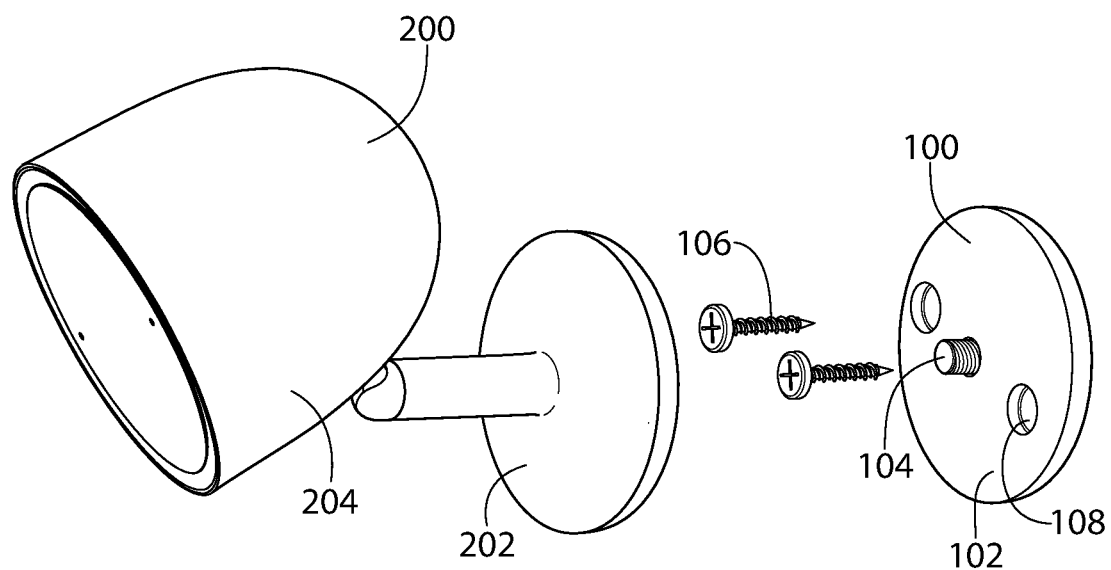
FIG. 2 is an exploded perspective view of the device and mount of FIG. 1.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Referring to the drawings in detail, wherein like reference numerals indicate like elements throughout, there is shown in FIGS. 1-4 a mount, generally designated 100, in accordance with implementations of the present invention. Mount 100 may be particularly configured for mounting a device 200 onto a wall, ceiling, or other substrate S. Device 200 may be an electronic device, for example, a camera system according to some implementations. In some implementations, device 200 may be a camera system such as that described in U.S. patent application Ser. No. 15/607,380, filed May 26, 2017, and U.S. patent application Ser. No. 15/606,888, filed May 26, 2017, each of which is incorporated herein by reference in its entirety. In some implementations, device 200 is or includes one or more audio devices (e.g., a speaker or microphone). In some implementations, device 200 is or includes one or more lights (e.g., LEDs). In some implementations, device 200 includes a base portion 202 which is configured to engage with and couple to mount 100, and a head portion 204 connected to base portion 202. Head portion 204 may house one or more device modules (e.g., camera modules) and, according to some implementations, may be configured to pivot and/or rotate relative to base portion 202.

In certain implementations, mount 100 includes a housing 102 and a device fastener 104 extending from housing 102 which is configured to fasten to device 200. In some implementations, device fastener 104 is configured to fasten to base portion 202 of device 200. In some such implementations, base portion 202 of device 200 includes a socket, nut, or other fastener hole which is sized and configured to receive at least a portion of device fastener 104. For example, in some implementations, device fastener 104 includes an externally threaded portion which is configured to screw into an internally threaded socket or nut provided on base portion 202.

In some implementations, mount 100 includes at least one wall fastener 106 which is configured to secure mount 100 to a wall, ceiling, shelf, or other substrate upon which device 200 is to be mounted. In some implementations, mount 100 includes two or at least two wall fasteners 106. In some such implementations, device fastener 104 may be positioned between at least two wall fasteners 106. Each wall fastener 106 may be, for example, a screw, nail, bolt, pin, or other mechanical fastener which may be received through at least a portion of housing 102 and inserted into the wall, ceiling, shelf, or other substrate. In some implementations, housing 102 includes a fastener hole 108 (FIG. 3C) for receiving a wall fastener 106 there through. In some implementations, housing 102 includes a separate fastener hole 108 for each wall fastener 106. In other implementations, mount 100 may be secured to the wall, ceiling, or other substrate using an adhesive, hook-and-loop fastener, magnetic fastener, or other type of suitable fastener known in the art.

Figure 3A:
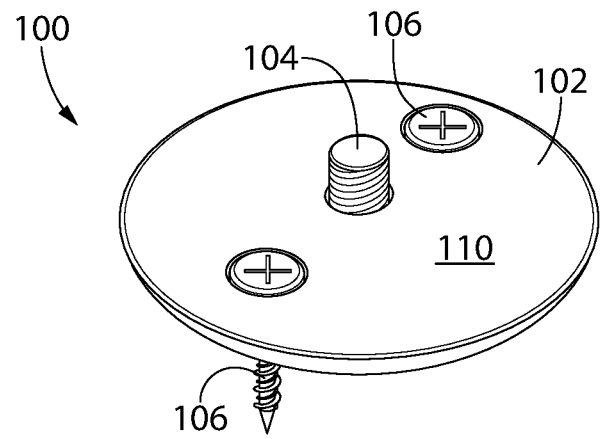
FIG. 3A is a top perspective view of a mount according to an implementation of the present invention showing a distal exterior surface of the mount.
Figure 3B:
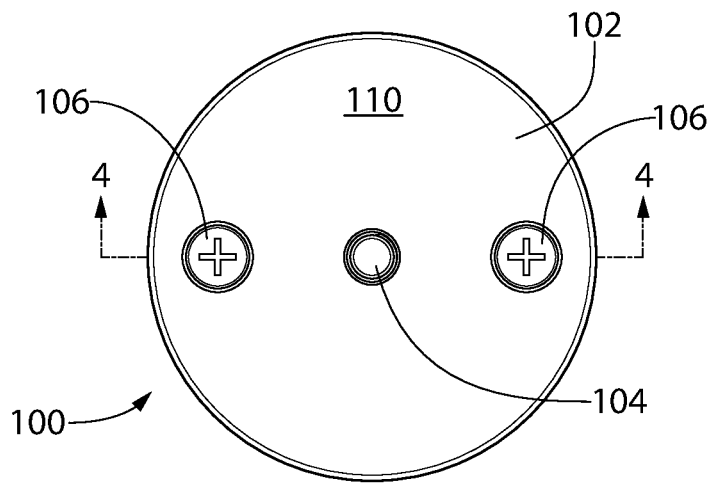
FIG. 3B is top plan view of the mount of FIG. 3A showing the distal exterior surface of the mount.

In some implementations, housing 102 of mount 100 includes a distal exterior surface 110. In some implementations, distal exterior surface 110 may be positioned and configured to abut against device 200 when device 200 is fully seated on mount 100. In some such implementations, distal exterior surface 110 may be positioned and configured to abut against a bottom surface of base portion 202 of device 200 when device 200 is fully seated on mount 100. Housing 102 at distal exterior surface 110 may be made from a rigid plastic or polymer, metal, metal alloy, or other sturdy material according to some implementations. Distal exterior surface 110, in some implementations, may be planar or substantially planar. In other implementations, distal exterior surface 110 may have a curved contour, e.g., a concave or convex curvature. In some implementations, as best shown in FIGS. 3A-3B, distal exterior surface 110 has a circular shape. It should be appreciated that distal exterior surface 110 may have other shapes (e.g., square, oval, polygonal, or irregular shapes) according to further implementations. In some implementations, distal exterior surface 110 has a shape and contour which matches or substantially matches the shape and contour of the bottom surface of base portion 202 of device 200.

Figure 3C:
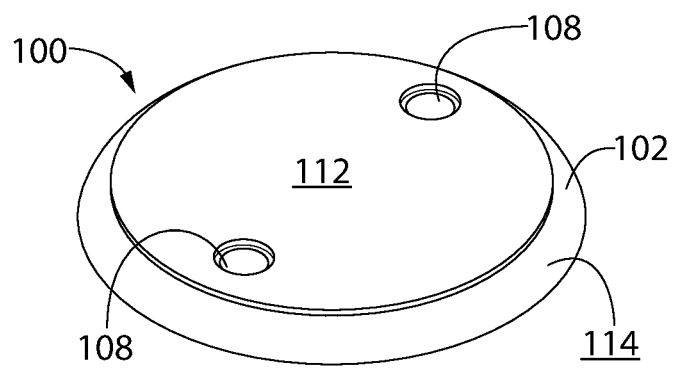
FIG. 3C is a bottom perspective view of the mount of FIG. 3A showing a proximal exterior surface of the mount with the wall fasteners removed.

In some implementations, housing 102 includes a proximal exterior surface 112 that is opposite of distal exterior surface 110. In some implementations, proximal exterior surface 112 may be positioned and configured to abut against the substrate (e.g., wall or ceiling) upon which mount 100 is to be secured. In some such implementations, proximal exterior surface 112 is provided with a pad of elastic or shock-absorbing material, for example, rubber, silicone, or other elastomeric material which is configured to contact the substrate. In some such implementations, the elastic or shock-absorbing material helps to dampen vibrations transferred from the substrate to mount 100 and device 200 (e.g., building vibrations). In some implementations, the elastic or shock-absorbing material may serve to protect the surface of the substrate from scratches caused by mount 100. Proximal exterior surface 112, in some implementations, may be planar or substantially planar. In other implementations, proximal exterior surface 112 may have a curved contour, e.g., a concave or convex curvature. In some implementations, as shown in FIG. 3C, proximal exterior surface 112 has a circular shape. It should be appreciated that other shapes (e.g., square, oval, polygonal, or irregular shapes) may be used according to further implementations. In some implementations, proximal exterior surface 112 is parallel to or substantially parallel to distal exterior surface 110. In some implementations, proximal exterior surface 112 has a broadest dimension (e.g., length, width, and/or diameter) that is less than a broadest dimension of distal exterior surface 110. For example, in the implementation illustrated in FIGS. 1-4, distal exterior surface 110 includes a diameter that is larger than a diameter of proximal exterior surface 112.

In further implementations, housing 102 of mount 100 includes a peripheral surface 114 which extends between distal exterior surface 110 and proximal exterior surface 112. In some implementations, peripheral surface 114 tapers from distal exterior surface 110 to proximal exterior surface 112. In some implementations, peripheral surface 114 has a contour which forms a substantially contiguous contour with an outer surface of base portion 202 when device 200 is fully seated onto mount 100, for example, as shown in FIG. 1.

Figure 4:
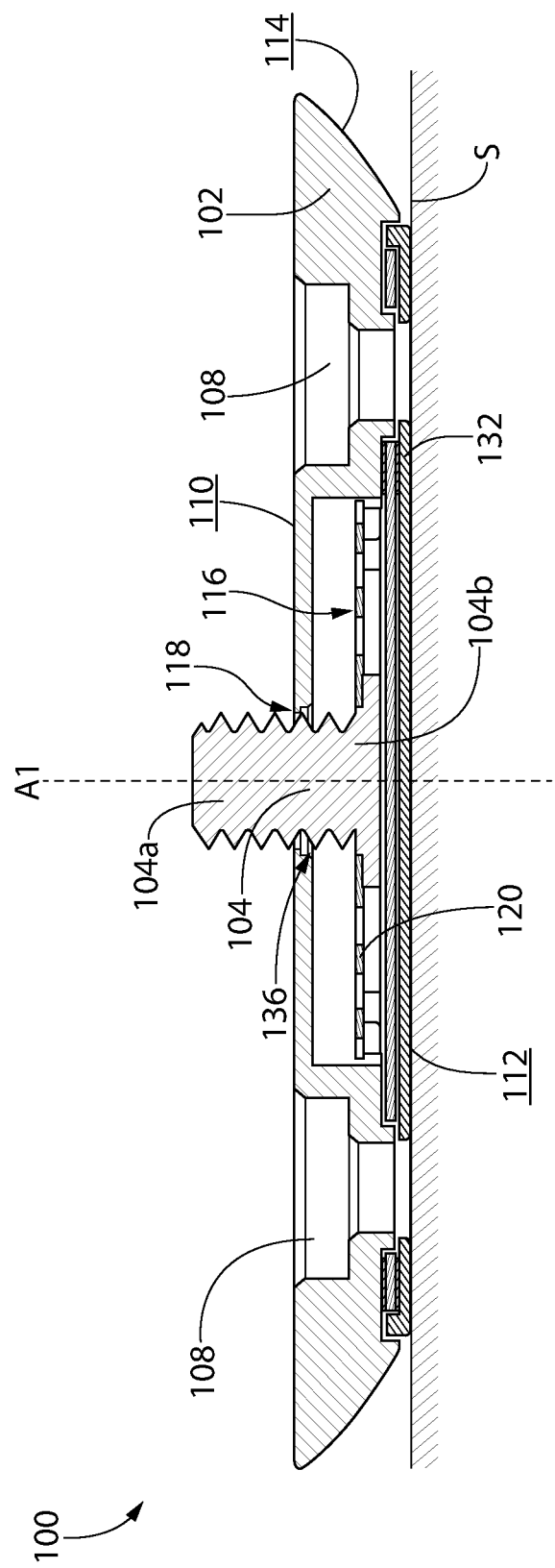
FIG. 4 is a side cross-sectional view of the mount of FIGS. 3A-3C taken along the plane designated by line 4-4 of FIG. 3B with the wall fasteners removed.

With particular reference now to FIG. 4, in some implementations housing 102 defines an interior space 116 located between distal exterior surface 110 and proximal exterior surface 112. In some implementations, device fastener 104 is disposed about a fastener axis A1 and includes a distal portion 104a and a proximal portion 104b. In some implementations, fastener axis A1 may be perpendicular to the wall, ceiling, or other substrate S to which mount 100 is to be secured. In some implementations, proximal portion 104b is positioned within interior space 116 and distal portion 104a extends distally outside of housing 102 through an aperture 118 provided in distal exterior surface 110. In some implementations, housing 102 includes a base plate 132 disposed proximally to interior space 116 and device fastener 104. In some implementations, base plate 132 is sized and configured to seal the proximal side of interior space 116. In some implementations, the pad of elastic material (e.g., rubber, silicone, etc.) provided on proximal exterior surface 112 is attached to a proximal side of base plate 132. In some implementations, the proximal exterior surface 112 does not include any apertures connecting to the interior space 116.

In some implementations, as described, distal portion 104a of device fastener 104 includes an external (male) thread configured to mate with an internal (female) thread provided on device 200, for example, on base portion 202 of device 200. The external thread on device fastener 104 may be, in some implementations, a standard tripod screw thread. In some implementations, the external thread is, for example, ¼-20 UNC (¼" diameter, 20 threads per inch) or ⅜-16 UNC (⅜" diameter, 16 threads per inch). In further implementations, device fastener 104 is moveable relative to housing 102. In some implementations, device fastener 104 is moveable relative to housing 102 in only one degree of freedom. In some implementations, which will be described further herein, device fastener 104 is configured to move linearly relative to housing 102 along fastener axis A1 in a distal-proximal direction. In some implementations, device fastener 104 is not configured to rotate with respect to housing 102 about fastener axis A1. In some implementations, device fastener 104 may be allowed to have a limited degree of rotation relative to housing 102 about fastener axis A1, for example, a rotational angle of less than 360°, less than 180°, less than 90°, less than 45°, less than 20°, less than 15°, less than 10°, or less than 5°. Aperture 118, in some implementations, connects with interior space 116 and has an opening diameter larger than the diameter of distal portion 104a of device fastener 104 to allow distal portion 104a to freely move axially through aperture 118. Moreover, in some implementations aperture 118 is not threaded such that, for example, distal portion 104a may move axially through aperture 118 without rotating distal portion 104a relative to aperture 118. In some implementations, proximal portion 104b of device fastener 104 includes a flange or flared portion having a dimension larger than the opening diameter of aperture 118 such that the proximal portion 104b of device fastener 104 cannot entirely pass through aperture 118. The flange or flared portion may be configured to abut against a portion of housing 102 to limit the distal movement of device fastener 104. In some implementations, device fastener 104 further includes a keyed feature which is configured to prevent rotation of device fastener 104 with respect to housing 102 about fastener axis A1. The keyed feature may be positioned, for example, on proximal portion 104b of device fastener 104 according to some such implementations. In some implementations, the keyed feature mates with a portion of housing 102 when device fastener 104 is moved to a maximal distal position relative to housing 102.

In further implementations, mount 100 includes a biasing element 120. Biasing element 120, in some implementations, couples device fastener 104 to housing 102 and is positioned within interior space 116. In some implementations, biasing element 120 is or includes a spring which is configured to deflect or flex when device fastener 104 is moved relative to housing 102 (e.g. in a distal direction along fastener axis A1). In some implementations, biasing element 120 is configured to apply a force on device fastener 104 in a proximal direction as device fastener 104 moves in a distal direction relative to housing 102. In some such implementations, biasing element 120 includes a first portion or end attached to device fastener 104 (e.g., at proximal portion 104b) and a second portion or end fixed relative to housing 102. In one implementation, biasing element 120 includes a coil spring positioned between proximal portion 104b of device fastener 104 and a portion of housing 102. In some implementations, biasing element 120 includes a sheet or beam of elastic or resilient material (e.g., spring steel or other elastic metal/alloy) which is secured to device fastener 104 and housing 102.

Figure 5:
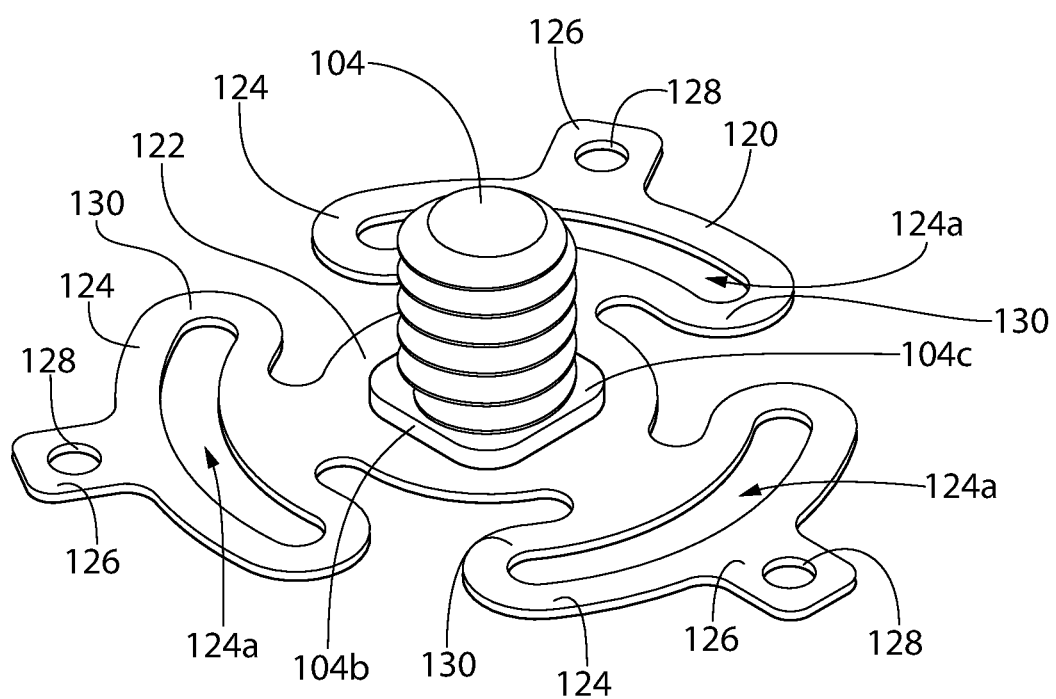
FIG. 5 is a perspective view of a device fastener and biasing element which may be used in a mount according to implementations of the present invention.

FIG. 5 provides a perspective view of a device fastener 104 and a biasing element 120 according to an example implementation. As shown, biasing element 120 includes a first, central portion 122 attached to proximal portion 104b of device fastener 104. In some implementations, as discussed, proximal portion 104b includes a flange or keyed portion 104c which is configured to abut against a portion of housing 102 to limit movement of device fastener 104. The flange or keyed portion 104c, in some implementations, may have a non-circular shape (e.g., square, oval, polygonal, or irregular shape). In some implementations, flange or keyed portion 104c may have rounded corners. Device fastener 104 may be, for example, press fit, welded, or otherwise attached to first, central portion 122 of biasing element 120 according to some such implementations. Device fastener 104, in some implementations, is not configured to rotate with respect to biasing element 120.

In some implementations, biasing element 120 includes one or more lobes 124 coupled to and circumferentially disposed around proximal portion 104b of device fastener 104. In the implementation illustrated in FIG. 5, biasing element 120 includes three lobes 124, though fewer or more lobes 124 may be included in other implementations. Each lobe 124 may extend radially away from device fastener 104 to a peripheral end 126 configured to be fixed relative to housing 102. In some such implementations, peripheral end 126 of each lobe 124 may include a tab which is configured to be secured to housing 102. In some implementations, peripheral end 126 includes an eyelet 128 for receiving a screw or other fastener for securing peripheral end 126 to housing 102. In some implementations, peripheral ends 126 may be secured to base plate 132 (FIG. 4) or other portions of housing 102. In some implementations, each lobe 124 is configured to elastically bend, flex, and/or stretch to allow device fastener 104 to move relative to peripheral ends 126. In some implementations, each lobe 124 may include one or more holes or cutouts 124a that are distinct from eyelets 128 and which are positioned between peripheral end 126 and device fastener 104. In some implementations, holes or cutouts 124a are configured to allow lobes 124 to bend, flex, and/or stretch. The one or more holes or cutouts 124a may have an arcuate shape or an at least partially arcuate shape according to certain implementations when biasing element 120 is in an unloaded (e.g., unflexed) condition. For example, as illustrated, each of the holes or cutouts 124a may have a convexly curved side towards peripheral end 126 and a concavely curved towards device fastener 104. The shape of holes or cutouts 124a may deform or expand when biasing element 120 is transitioned to a loaded (e.g., flexed) condition. In further implementations, each lobe 124 includes at least one sinuous segment 130 extending between peripheral end 126 and proximal portion 104b of device fastener 104. In some implementations, each lobe 124 includes at least two sinuous segments 130 extending between peripheral end 126 and proximal portion 104b of device fastener 104. In some implementations, the holes or cutouts 124a may be at least partially bordered by one or more (e.g., two) sinuous segments 130. Each sinuous segment 130 may be elastic and configured to bend, twist, and/or stretch. Sinuous segments 130 may be flexible and configured to elastically expand or stretch when device fastener 104 is moved. In some implementations, all or portions of biasing element 120 (e.g., at least sinuous segments 130) may be made from a sheet of elastic material (e.g., elastic metal or metal alloy, spring steel or similar material) which has been, for example, cut or machined to have the desired shape and configuration.

Figure 6A:
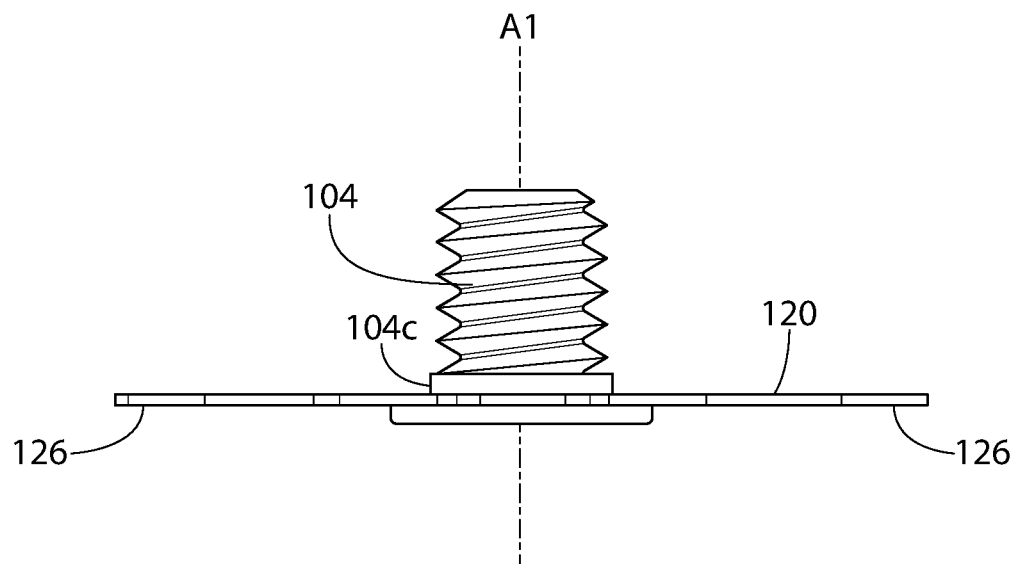
FIG. 6A is a side view of the device fastener and biasing element of FIG. 5 in an unloaded condition according to an implementation of the present invention.
Figure 6B:
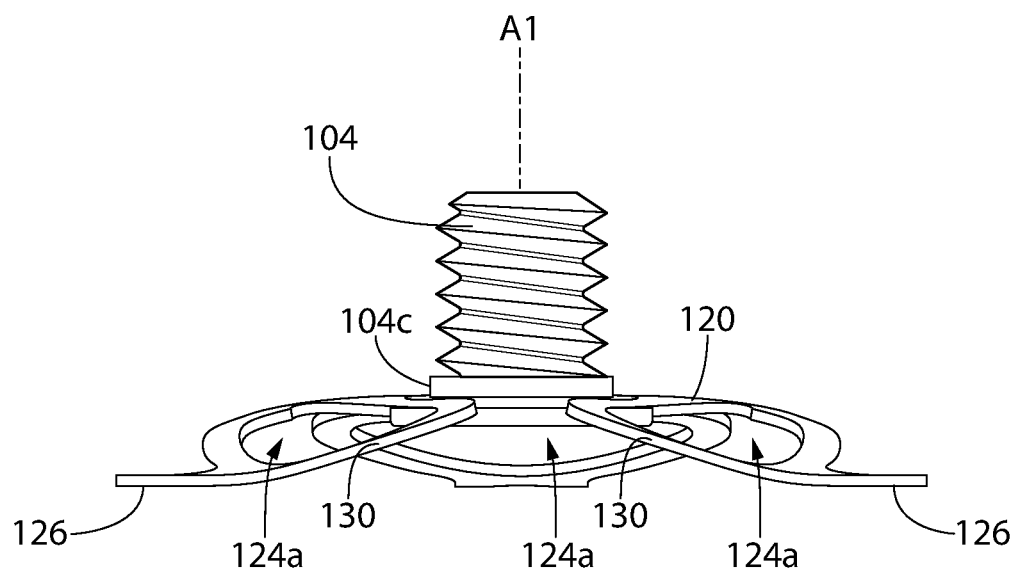
FIG. 6B is a side view of the device fastener and biasing element of FIG. 6A in a loaded condition according to an implementation of the present invention.

FIGS. 6A and 6B show the movement of device fastener 104 and biasing element 120 according to an implementation of the present invention. In FIG. 6A, biasing element 120 is shown in an unloaded condition according to one implementation. In this unloaded condition, biasing element 120 is not deflected and has a substantially planar configuration. When device fastener 104 is moved in a distal direction along fastener axis A1 (towards the top of the page), biasing element transitions to a loaded condition and deflects into a curved or expanded configuration as shown in FIG. 6B. Holes or cutouts 124a may deform or expand (e.g., in a radial direction) as biasing element 120 is deflected. In the loaded condition, according to some implementations, sinuous segments 130 also become stretched.

Figure 7:
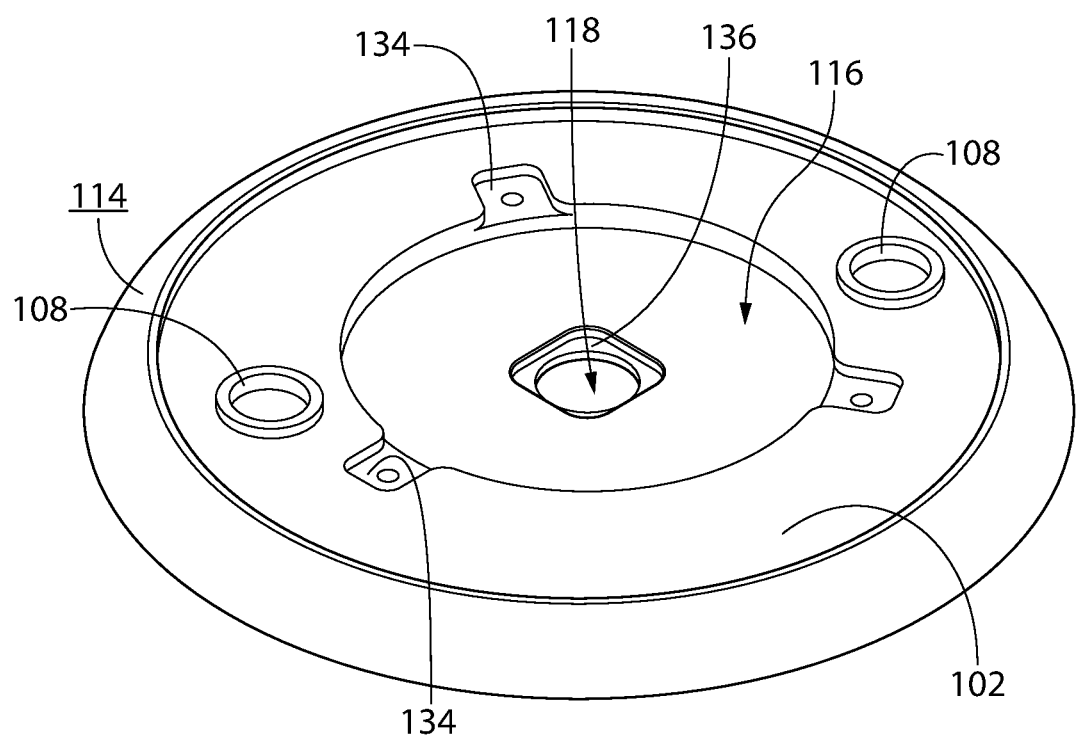
FIG. 7 is a bottom perspective view of the housing of the mount of FIGS. 3A-3C with the proximal exterior surface removed.

FIG. 7 shows a bottom perspective view of a housing 102 according to another implementation with the base plate and proximal exterior surface removed for clarity. In this implementation, interior space 116 of housing 102 includes peripheral indentations 134 for receiving peripheral ends 126 of biasing element 120 (FIG. 5). In some implementations, peripheral ends 126 may be secured in the peripheral indentations 134 via screws or other fasteners which are received through eyelets 128 as discussed above. In some implementations, interior space 116 further includes a recess 136 which is positioned and shaped to receive flange or keyed portion 104c (FIG. 5) of device fastener 104. Recess 136 may be may be axially aligned with aperture 118 according to some implementations. In some implementations, once flange or keyed portion 104c of device fastener 104 is received in recess 136, device fastener 104 cannot move further distally relative to housing 102. In some implementations, flange or keyed portion 104c and recess 136 are shaped and sized such that flange or keyed portion 104c is unable to rotate with respect to recess 136 when flange or keyed portion 104c is received within recess 136. For example, flange or keyed portion 104c and recess 136 may have a square or other non-circular shape. In some implementations, flange or keyed portion 104c and recess 136 may have a polygonal shape with rounded corners in order to facilitate seating of flange or keyed portion 104c within recess 136. In some implementations, flange or keyed portion 104c and/or recess 136 may have a beveled or chamfered edge in order to facilitate seating of flange or keyed portion 104c within recess 136.

Figure 8:
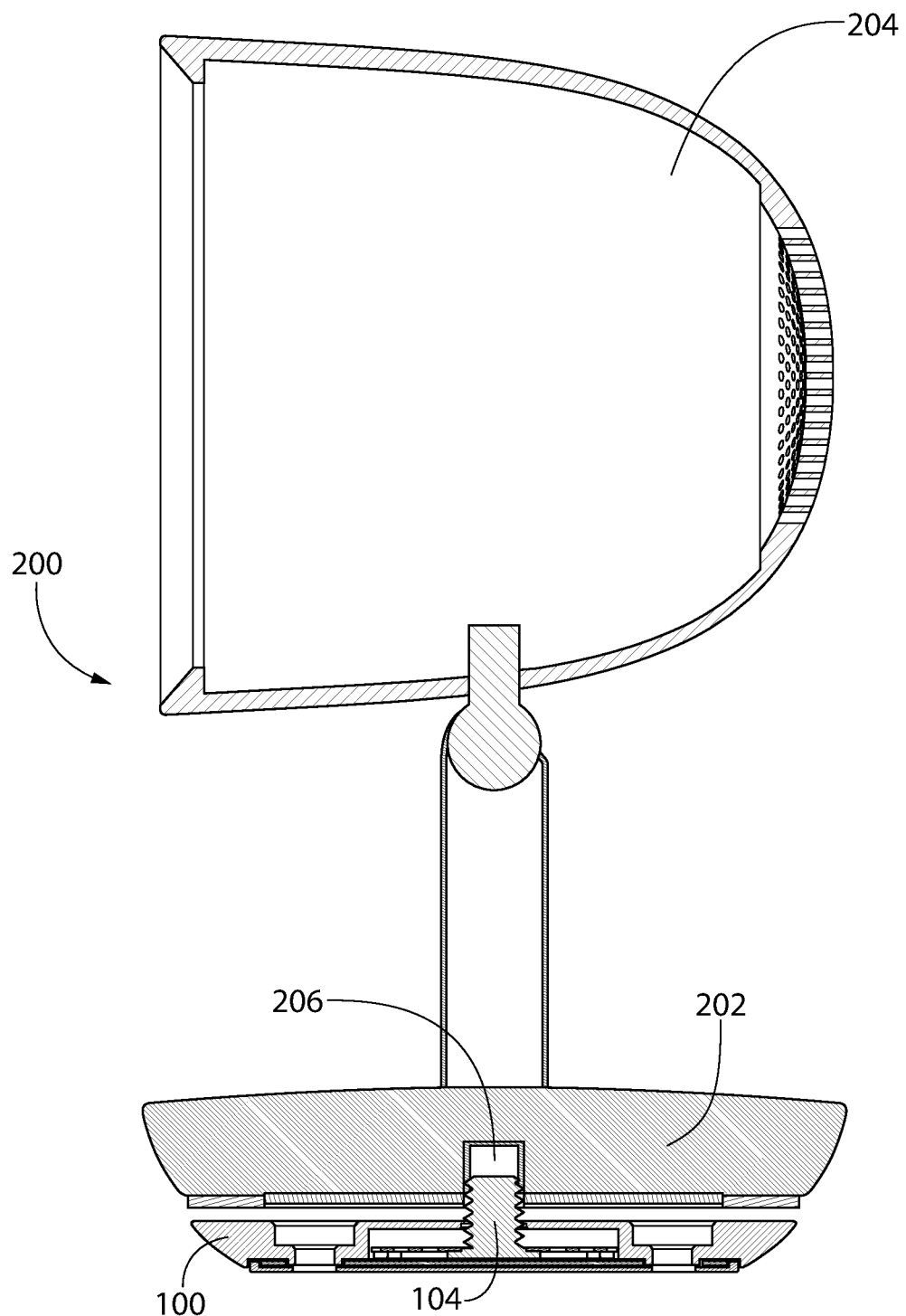
FIG. 8 is a side cross-sectional view of a device being coupled to a mount according to an implementation of the present invention.
Figure 9A:
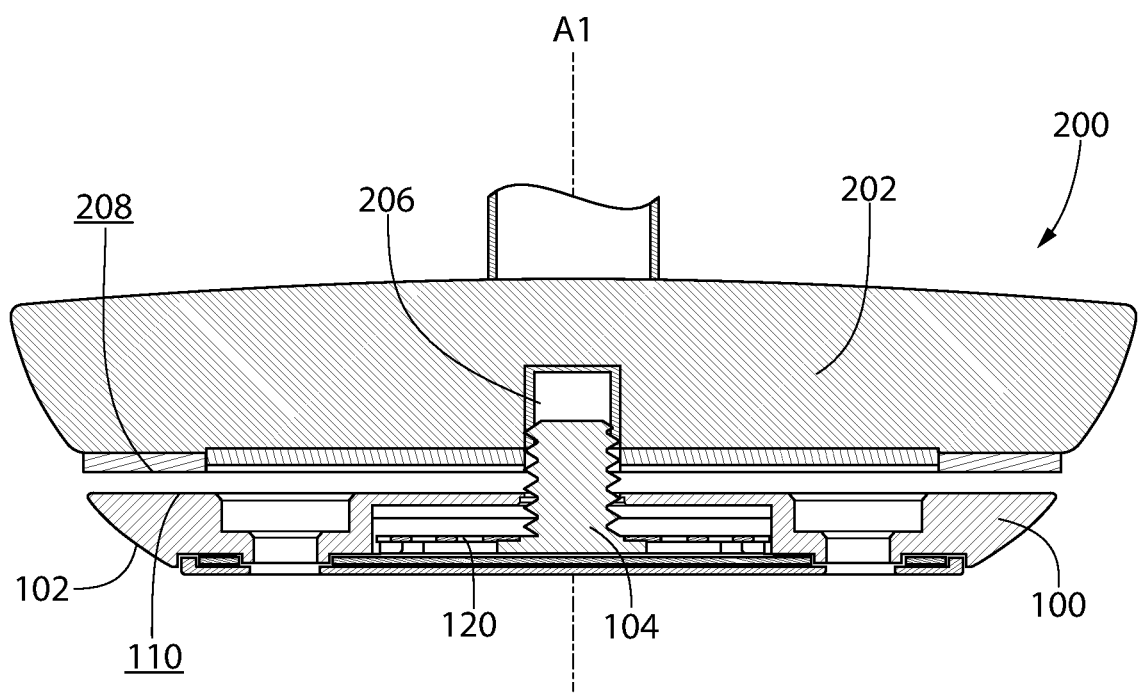
FIG. 9A is an enlarged side cross-sectional view of the base of the device of FIG. 8 being coupled to the mount.
Figure 9B:
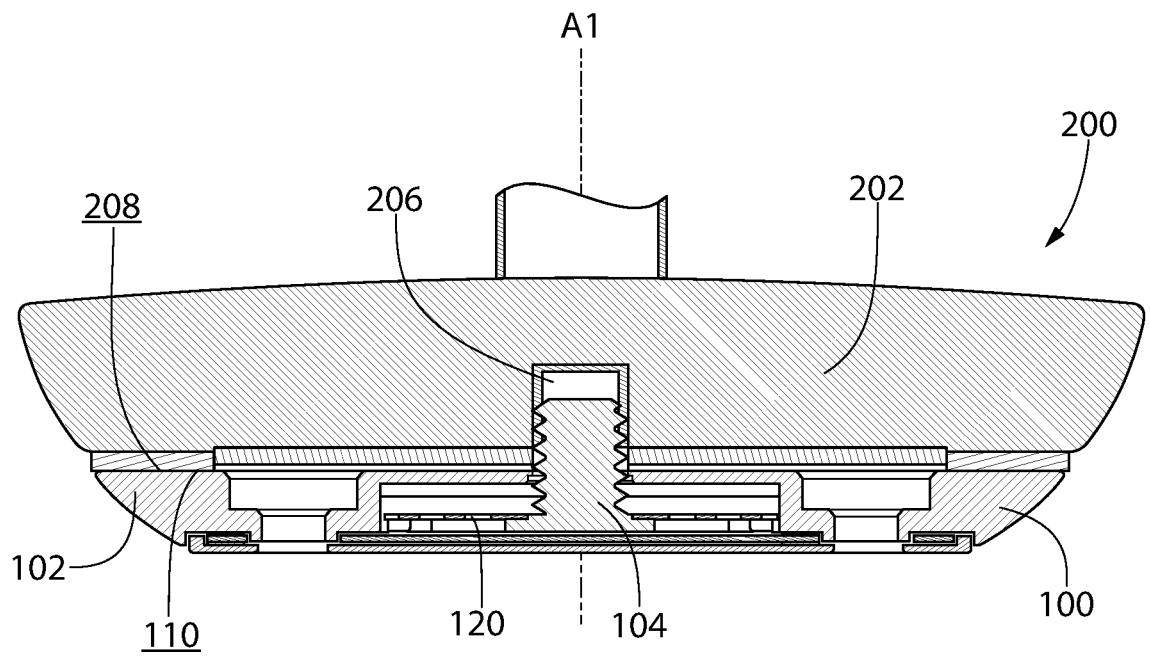
FIG. 9B is s side cross-sectional view of the base of the device of FIG. 9A with the base of the device fully seated against the mount according to an implementation of the present invention.
Figure 9C:
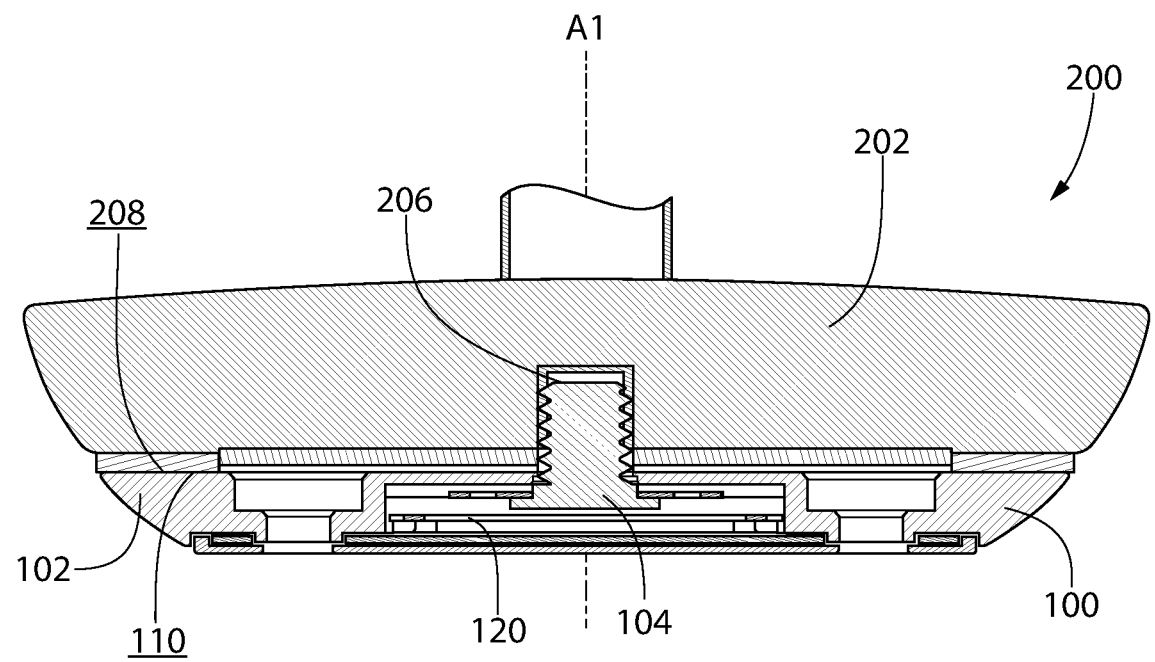
FIG. 9C is a side cross-sectional view of the base of the device of FIG. 9B with the base of the device fully seated against the mount and the device fastener being moved distally further into the device according to an implementation of the present invention.
Figure 9D:
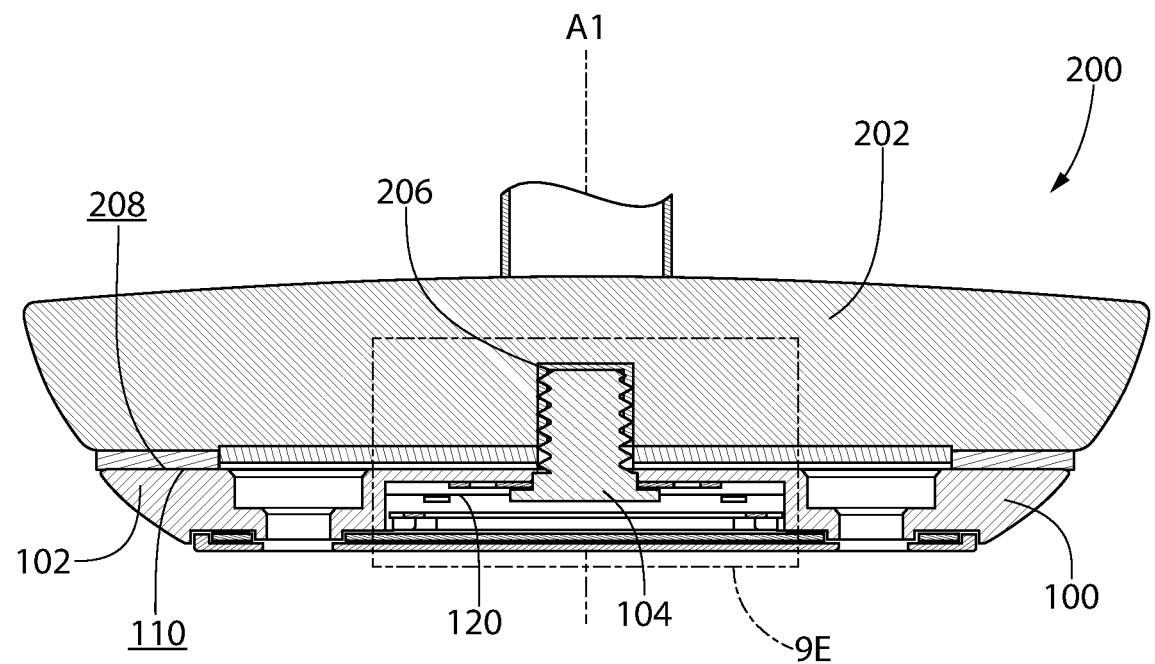
FIG. 9D is a side cross-sectional view of the base of the device of FIG. 9C with the base of the device fully seated against the mount and the device fastener at a maximum distal position with respect to the device according to an implementation of the present invention.
Figure 9E:
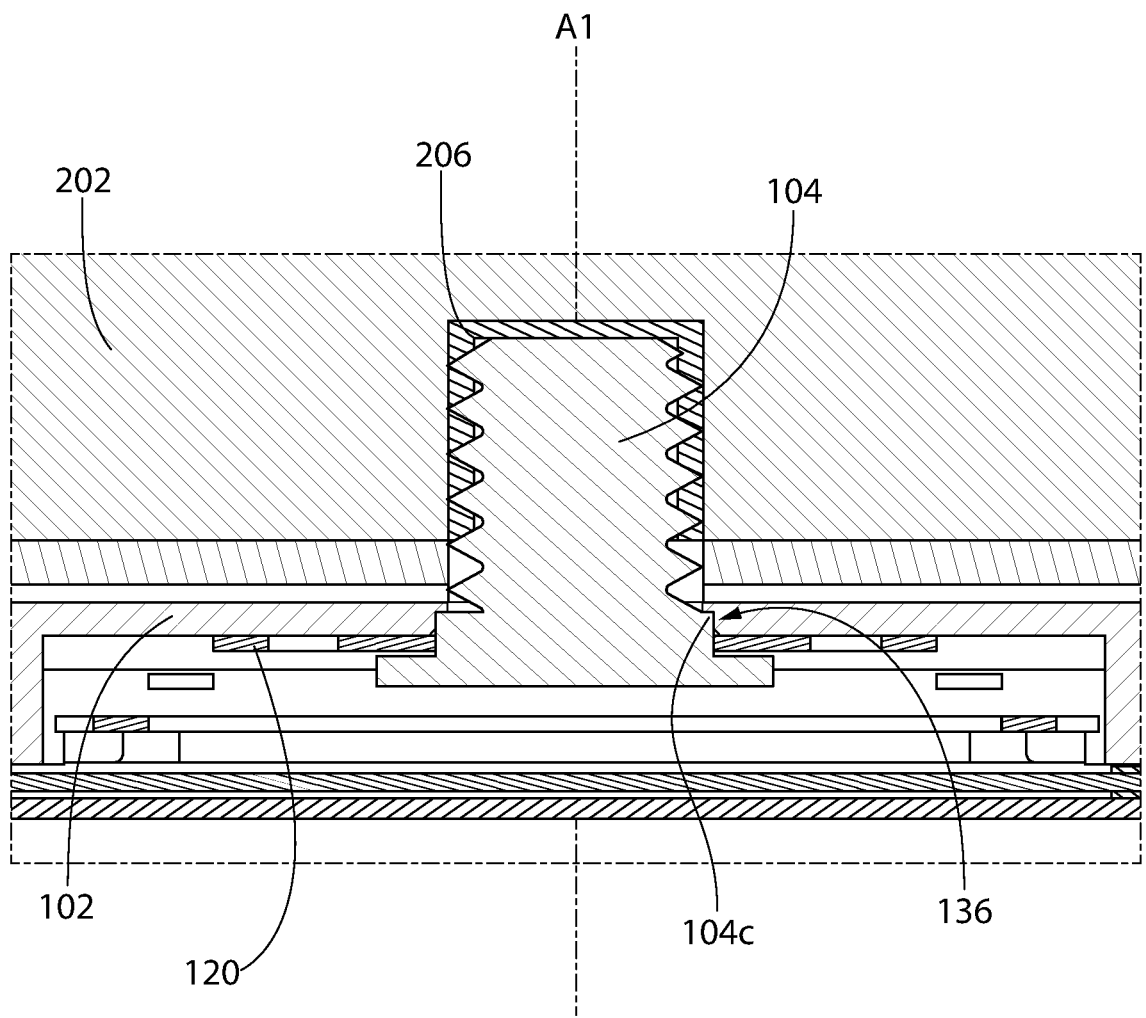
FIG. 9E is an enlarged partial side cross-sectional view of the base of the device and mount shown in FIG. 9D.

Reference now will be made to FIGS. 8-9E which show the coupling of device 200 to mount 100 according to certain implementations of the present invention. FIGS. 8 and 9A show a side cross-sectional view of device 200 being coupled to mount 100. Mount 100 may be secured to a wall, ceiling, or other substrate (e.g., via wall fasteners 106, not shown) prior to being coupled with device 200. In this implementation, base portion 202 of device 200 includes a socket or nut 206 which is configured to receive device fastener 104 of mount 100. Socket or nut 206 may include, for example, an internal thread which is sized and configured to mate with an external thread provided on device fastener 104. Once socket or nut 206 is axially aligned with device fastener 104, base portion 202 may be rotated in a first rotational direction (e.g., clockwise) about fastener axis A1 with respect to mount 100 to screw device 200 onto device fastener 104. As base portion 202 is rotated in the first rotational direction according to some implementations, the external thread of device fastener 104 engages with the internal thread of socket or nut 206, thereby causing bottom surface 208 of device 200 to move closer to distal exterior surface 110 of mount 100. In some implementations, device fastener 104 does not rotate with respect to housing 102 as device 200 is screwed onto mount 100. In some implementations, device fastener 104 is held in place with respect to housing 102 by biasing element 120.

FIG. 9B shows device 200 fully coupled with mount 100. Device 200 is fully coupled to mount 100 according to some implementations when bottom surface 208 of device 200 abuts with distal exterior surface 110 of mount 100. Once device 200 is fully coupled to mount 100, device 200 is allowed to further rotate with respect to mount 100 in the first rotational direction in some implementations. According to some such implementations, further rotation of device 200 after device 200 is fully coupled to mount 100 allows for the orientation of device 200 to be adjusted to the desired position by the user. Where device 200 is a camera device, for example, the ability to further rotate device 200 may allow a user to orient the camera device such that the captured images are aligned in a desired manner with respect to the horizon or other reference. Thus, in some implementations, mount 100 is configured to provide an additional rotational degree of freedom to device 200. In some such implementations, device 200 is allowed to rotate up to or at least an additional 360 degrees (e.g., one full rotation) relative to the mount in the first rotational direction after device 200 is fully coupled to mount 100. In some such implementations, device 200 is allowed to rotate up to or at least an additional 450 degrees (e.g., one and a quarter rotations) relative to the mount in the first rotational direction after device 200 is fully coupled to mount 100. In some such implementations, device 200 is allowed to rotate up to or at least an additional 540 degrees (e.g., one and a half rotations) relative to the mount in the first rotational direction after device 200 is fully coupled to mount 100. In some such implementations, device 200 is allowed to rotate up to or at least an additional 720 degrees (e.g., two full rotations) relative to the mount in the first rotational direction after device 200 is fully coupled to mount 100. Rotation of device 200 in the first rotational direction after device 200 is fully coupled to mount 100 causes device fastener 104 to move in a distal direction relative to housing 102 along fastener axis A1, which in turn causes biasing element 120 to transition from an unloaded condition (FIG. 9B) to a loaded condition (FIG. 9C).

As shown in FIGS. 9C and 9D, in some implementations biasing element 120 becomes deflected into a curved or expanded configuration as device fastener 104 is drawn further into socket or nut 206 due to the further rotation of device 200. In some implementations, biasing element 120 is configured to increase the contact and/or frictional force between bottom surface 208 of device 200 and distal exterior surface 110 of mount 100 as device 200 is further rotated in the first rotational direction and device fastener 104 moves further in the distal direction relative to housing 102. In some implementations, device 200 may be further rotated in the first rotational direction until flange or keyed portion 104c of device fastener 104 is received in recess 136 of housing 102 as best shown in FIG. 9E. In some implementations, abutment of flange or keyed portion 104c with housing 102 in recess 136 prevents device fastener 104 from moving further in the distal direction relative to housing 102 and prevents further rotation of device 200 with respect to mount 100 in the first rotational direction. To remove device 200 from mount 100, device 200 may be unscrewed from device fastener 104 by rotating device 200 in a second rotational direction opposite the first rotational direction until device fastener 104 disengages from socket or nut 206.

Figure 10:
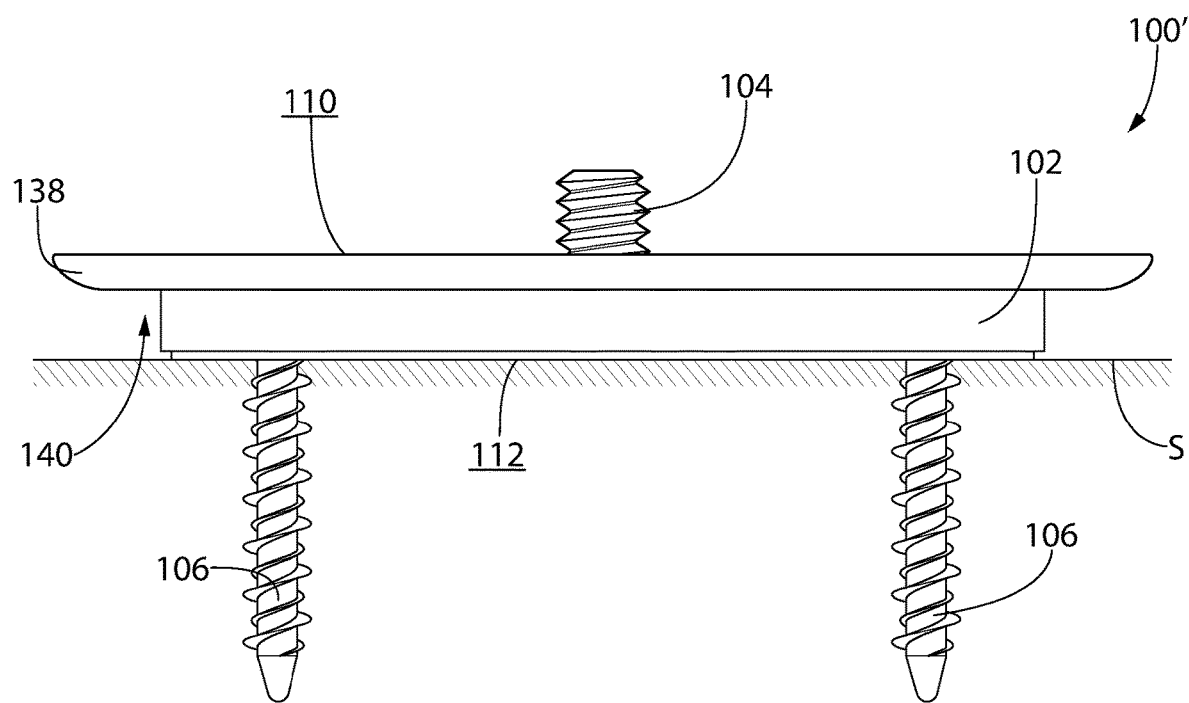
FIG. 10 is a side view of a mount according to another implementation of the present invention.
Figure 11A:
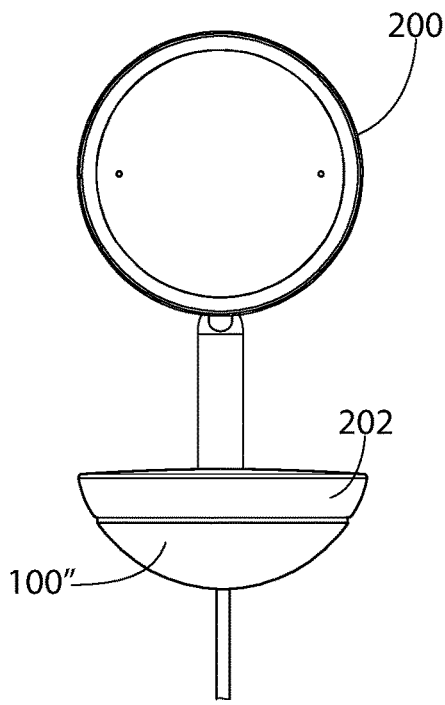
FIG. 11A is a front view of a device coupled to a mount according to yet another implementation of the present invention.
Figure 11B:
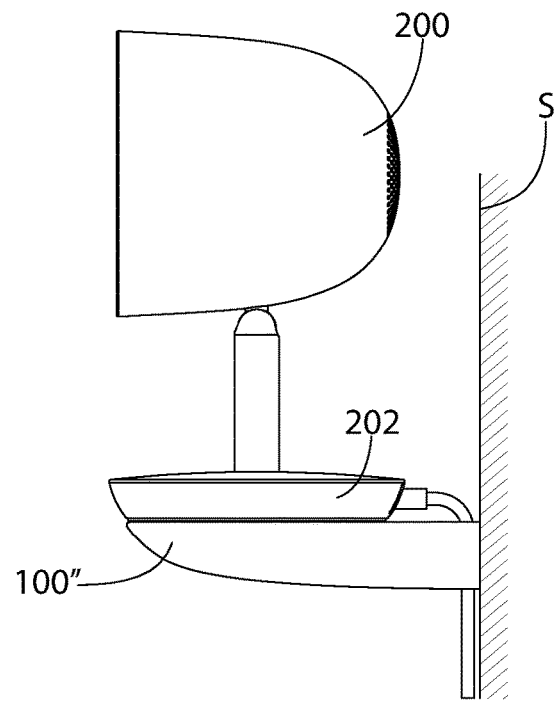
FIG. 11B is a side view of the device and mount shown in FIG. 11A.
Figure 11C:
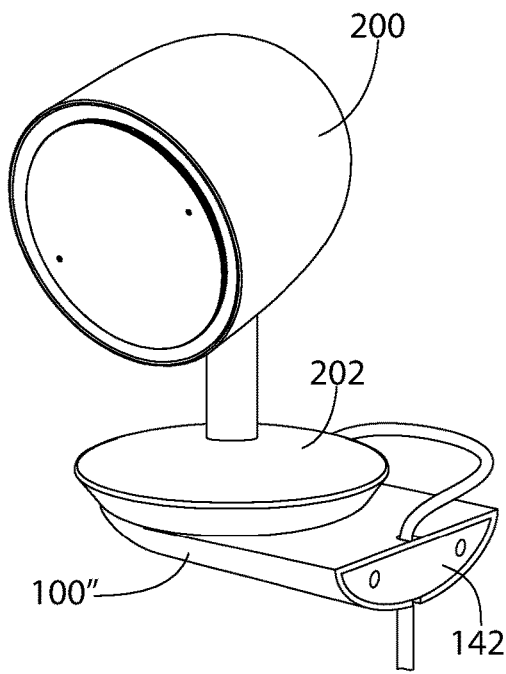
FIG. 11C is a rear perspective view of the device and mount shown in FIG. 11A with the device in a first rotational position with respect to the mount.
Figure 11D:
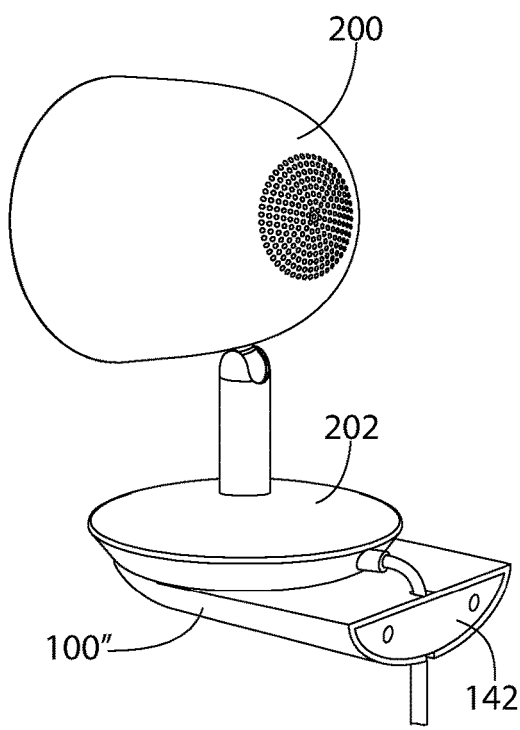
FIG. 11D is a rear perspective view of the device and mount shown in FIG. 11C with the device in a second rotational position with respect to the mount.

FIG. 10 shows a mount 100' according to a further implementation of the present invention. Mount 100' may be similarly configured as mount 100 described above except that mount 100' includes a housing 102' having an overhanging edge 138 along the periphery of distal exterior surface 110. When mount 100' is mounted onto a wall, ceiling, or other substrate S, overhanging edge 138 at least partially defines a peripheral channel or groove 140 around housing 102 which may be used, for example, in receiving a wire or cable of device 200.

Figure 12:
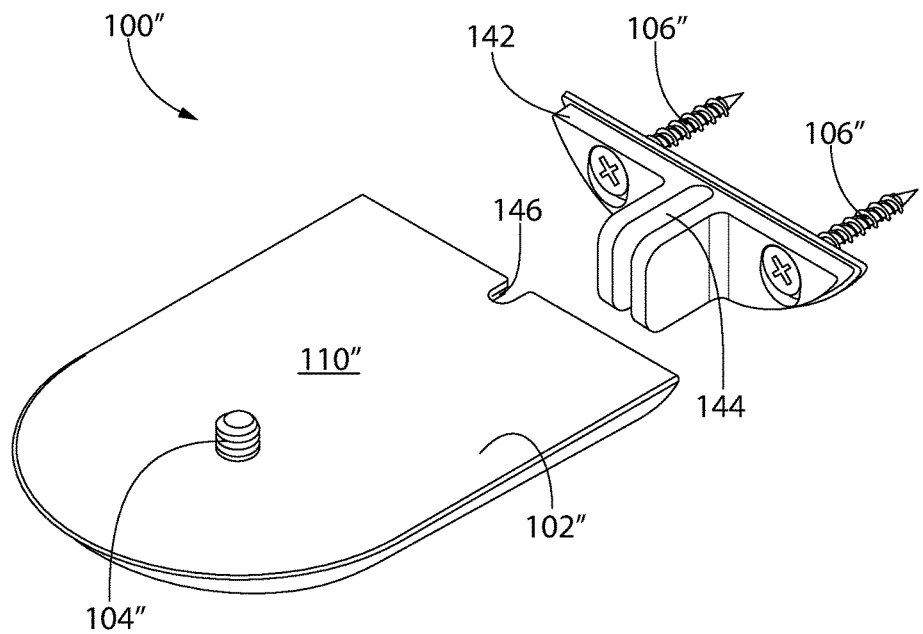
FIG. 12 is an exploded perspective view of the mount shown in FIGS. 11A-11D.

FIGS. 11A-13 show a mount 100" according to yet another implementation of the present invention. As shown in FIGS. 11A-11D, mount 100" in some implementations may be configured as a shelf or cantilever on which a device 200 may be mounted. In some such implementations, mount 100" is configured to extend perpendicularly from a wall or other substrate S and, as best shown in FIG. 12, includes a housing 102" which is configured to be coupled to an end bracket 142. In some implementations, end bracket 142 is configured to be secured to wall or other substrate S by one or more wall fasteners 106" and defines a gap 144 for receiving a wire or cable of device 200. In some implementations, housing 102" includes a notch 146 in distal exterior surface 110" which is configured to align with at least a portion of gap 144 to provide clearance for the wire or cable received in gap 144.

Figure 13:
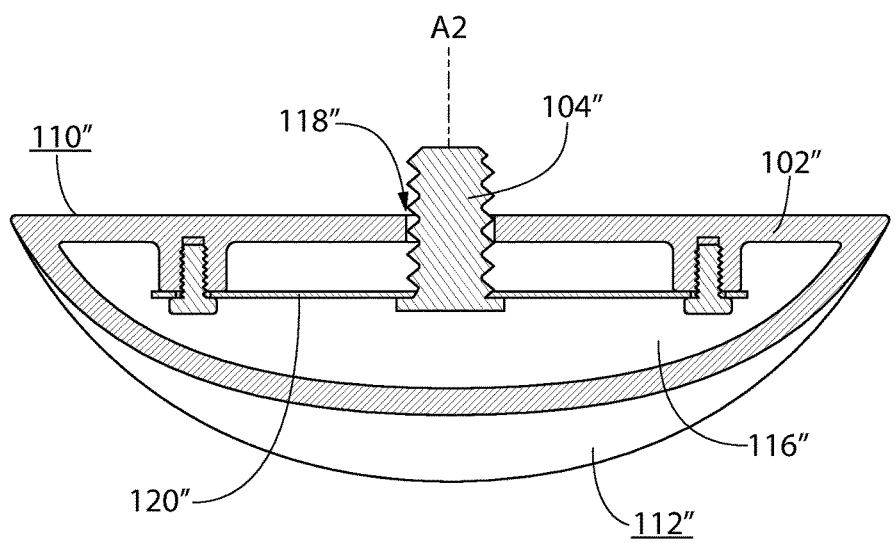
FIG. 13 is a cross-sectional view of the mount shown in FIGS. 11A-11D.

As shown in FIG. 13, mount 100" further includes a device fastener 104" extending through an aperture 118" in distal exterior surface 110" for fastening to device 200 in a manner similar to that described for mount 100. Device fastener 104", in some implementations, includes a proximal portion positioned within interior space 116" of housing 102" and a threaded distal portion which extends through aperture 118". In further implementations, the proximal portion of device fastener 104" is coupled to a biasing element 120" within interior space 116" of housing 102" in a configuration similar to the implementations described above with respect to mount 100. According to some implementations, device fastener 104" of mount 100" is disposed about a fastener axis A2 which may be parallel to the wall or other substrate S to which mount 100" is to be secured rather than perpendicular. Furthermore, in some implementations, proximal exterior surface 112" of housing 102" may be curved (e.g., convexly curved) rather than planar. Proximal exterior surface 112", in some implementations, may be shaped to have contour which forms a substantially contiguous contour with an outer surface of base portion 202 when device 200 is fully seated onto mount 100", as shown in FIGS. 11A-11D.

In some implementations, a mount according to the present invention (e.g., mount 100, 100', mount 100") may be provided together with a device 200 (e.g., a camera or other device) as a system or a kit for mounting the device to a wall, ceiling, or other substrate. In some implementations, a device 200 may be provided with more than one mount, which may be the same or different (e.g., mount 100 and mount 100"). It should also be appreciated that a mount according to the present invention may be provided alone without device 200.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A mount for a device, the mount comprising:
a housing having an inner surface defining an interior space, the housing including a distal exterior surface having an aperture connected to the interior space;
a fastener configured to fasten to the device and disposed about a fastener axis, the fastener including a proximal portion positioned within the interior space of the housing and a distal portion extending through the aperture, the fastener being configured to move relative to the housing along the fastener axis in a distal-proximal direction without substantially rotating about the fastener axis; and
a biasing element disposed within the interior space of the housing and non-rotatably attached to the inner surface of the housing and the proximal portion of the fastener, the biasing element configured to apply a force on the fastener in a proximal direction as the fastener moves in a distal direction relative to the housing.

2. The mount of claim 1, wherein the distal portion of the fastener includes an external thread.

3. The mount of claim 1, wherein the biasing element comprises a first portion attached to the proximal portion of the fastener, and a second portion fixed relative to the housing.

4. The mount of claim 3, wherein the first portion is a central portion of the biasing element, and the second portion is a peripheral portion of the biasing element.

5. The mount of claim 4, wherein the biasing element has a substantially planar configuration in an unloaded condition, and a curved configuration in a loaded condition when the fastener is moved relative to the housing.

6. The mount of claim 5, wherein the biasing element includes a plurality of lobes coupled to and disposed circumferentially around the proximal portion of the fastener, each of the plurality of lobes having a peripheral end fixed relative to the housing.

7. The mount of claim 6, wherein each of the plurality of lobes comprises at least one sinuous segment between the peripheral end of the lobe and the proximal portion of the fastener.

8. The mount of claim 1, wherein the fastener includes a keyed feature which is configured to prevent rotation of the fastener relative to the housing about the fastener axis.

9. The mount of claim 8, wherein the keyed feature is disposed on the proximal portion of the fastener.

10. The mount of claim 1, wherein the housing further comprises a proximal exterior surface, the interior space being positioned between the proximal exterior surface and the distal exterior surface.

11. The mount of claim 10, wherein the proximal exterior surface does not include any apertures connecting to the interior space.

12. The mount of claim 10, wherein the distal exterior surface has a broadest dimension greater than a broadest dimension of the proximal exterior surface.

13. The mount of claim 10, further comprising an elastic pad positioned on the proximal exterior surface.

14. The mount of claim 10, further comprising at least one additional fastener configured to secure the mount onto a substrate.

15. A system comprising:
a device including a base portion having a bottom surface and a fastener hole; and
a mount for coupling to the device, the mount comprising:
a housing having an inner surface defining an interior space, the housing including a distal exterior surface having an aperture connected to the interior space;
a fastener disposed about a fastener axis, the fastener including a proximal portion positioned within the interior space of the housing and a distal portion extending through the aperture and sized to be at least partially received within the fastener hole, the fastener being configured to move relative to the housing along the fastener axis in a distal-proximal direction without substantially rotating about the fastener axis; and
a biasing element disposed within the interior space of the housing and non-rotatably attached to the inner surface of the housing and the proximal portion of the fastener, the biasing element configured to apply a force on the fastener in a proximal direction as the fastener moves in a distal direction relative to the housing.

16. The system of claim 15, wherein the distal portion of the fastener includes a first thread,
wherein the fastener hole of the device includes a second thread that is configured to mate with the first thread of the fastener, and wherein rotation of the device in a first rotational direction relative to the mount about the fastener axis when the fastener is received in the fastener hole causes the bottom surface of the base portion of the device and the distal exterior surface of the housing of the mount to move towards each other.

17. The system of claim 16, wherein the device is in a fully coupled state relative to the mount when the fastener is received in the fastener hole and the bottom surface of the base portion of the device abuts against the distal exterior surface of the housing of the mount.

18. The system of claim 17, wherein the device is able to rotate in the first rotational direction relative to the mount about the fastener axis at least an additional 360 degrees after the device has reached the fully coupled state relative to the mount.

19. The system of claim 18, wherein additional rotation of the device in the first rotational direction relative to the mount after the device has reached the fully coupled state relative to the mount causes movement of the fastener in the distal direction relative to the housing.

20. The system of claim 19, wherein the movement of the fastener in the distal direction relative to the housing causes the biasing element to transition from an unloaded condition to a loaded condition, and wherein the biasing element is configured to increase a contact force between the bottom surface of the base portion of the device and the distal exterior surface of the housing of the mount as the biasing element transitions from the unloaded condition to the loaded condition.

21. A mount for a device, the mount comprising:
a housing having an inner surface defining an interior space, the housing including a distal exterior surface having an aperture connected to the interior space;
a fastener disposed about a fastener axis and having a proximal portion and a distal portion, the proximal portion disposed within the interior space of the housing and the distal portion extending through the aperture and including threads disposed on an exterior surface; and
a biasing element disposed within the interior space of the housing, the biasing element having a first end being non-rotatably coupled to the proximal portion of the fastener and a second end non-rotatably coupled to the inner surface of the housing, the biasing element being in an unloaded state in an initial position and in an expanded and loaded state in a mounting position,
wherein the fastener translates along the fastener axis relative to the housing between the initial position and the mounting position without substantially rotating about the fastener axis.

22. The mount of claim 21, wherein the biasing element applies a force on the fastener in a proximal direction once the device, as it is being screwed onto the fastener, contacts the distal exterior surface of the housing and draws the fastener through the aperture of the housing.

23. The mount of claim 1, wherein the biasing element includes a center connection point coupling the biasing element to the fastener and at least three connection points coupling the biasing element to the housing, the at least three connection points spaced around the center connection.

24. The mount of claim 1, wherein the distal exterior surface is flat.

25. The mount of claim 1, wherein a distal end of the distal portion of the fastener is flat.

26. The mount of claim 1, wherein the housing has a bottom surface opposed to the distal exterior surface, and wherein the bottom surface is flat.

27. The mount of claim 1, wherein the fastener axis is perpendicular to the distal exterior surface.

28. The mount of claim 1, wherein the force on the fastener increases as the fastener moves in the distal direction relative to the housing.

29. The system of claim 15, wherein the bottom surface is flat.

30. The mount of claim 21, wherein a height of the biasing element is greater when the biasing element is the mounting position than when the biasing element is in the initial position.

31. The mount of claim 21, wherein the biasing element is flat in the initial position.

* * * * *